United States Patent [19]

Tamura et al.

[11] Patent Number: 4,586,029
[45] Date of Patent: Apr. 29, 1986

[54] BLUR DETECTING DEVICE

[75] Inventors: Shuichi Tamura; Kiyoshi Iizuka, both of Kanagawa, Japan

[73] Assignee: Canon Kabushiki Kaisha, Tokyo, Japan

[21] Appl. No.: 546,082

[22] Filed: Oct. 27, 1983

[30] Foreign Application Priority Data

Oct. 29, 1982 [JP] Japan ................................ 57-188987

[51] Int. Cl.⁴ ............................................. G08B 21/00
[52] U.S. Cl. .................................... 340/540; 340/683; 354/289.1; 354/465; 354/476
[58] Field of Search ........................ 340/540, 521, 683; 354/465, 289.1, 289.11, 289.12, 354, 476

[56] References Cited

U.S. PATENT DOCUMENTS 4,273,430  6/1981  Fritsche et al. ...................... 354/465
4,502,771  3/1985  Katsuma et al. .................... 340/521

Primary Examiner—Glen R. Swann, III
Attorney, Agent, or Firm—Toren, McGeady, Stanger, Goldberg & Kiel

[57] ABSTRACT

A blur detecting device comprises a plurality of photo-electric converter elements which are arranged in different positions to receive light from an object and to convert quantities of light received into quantities of electricity. Electric charge storing elements are included which store the quantities of electricity obtained from the photo-electric converter elements. A computing circuit in the blur detecting device obtains the ratio of the quantities of electricity stored at the electric charge storing elements. An indicating circuit compares signals produced from the computing circuit at different lengths of light receiving time and indicates a blurred state of the light received from the object.

21 Claims, 6 Drawing Figures

BLUR DETECTING DEVICE

BACKGROUND OF THE INVENTION

1. Field of the Invention

This invention relates to a picture image blur detecting device for detecting a blur due to hand vibration or the like introduced to a still picture camera.

2. Description of the Prior Art

Heretofore, blur detecting devices adapted for detection of a blur of light received from an object have been arranged, for example, as disclosed in Japanese Patent Publication No. SHO 54-55430, to detect whether a picture image has moved or not by comparing picture image signals obtained at different points of time from a plurality of light sensitive elements which receive light within the same predetermined period of time and to provide warning of camera-shake due to hand vibration, etc. as is necessary according to agreement or disagreement between these compared signals. However, in these cases where the blur of the picture image is synchronous or intermittent, the blur detecting device becomes incapable of detecting the blur when the light receiving period of the above-stated picture image signal happens to coincide with the blurring period. Therefore, use of a camera with such a blur detecting device has sometimes resulted in a blurred picture without giving any warning to the photographer of camera-shake due to hand vibration.

SUMMARY OF THE INVENTION

The present invention is directed to the solution of the above-stated problem of the prior art devices. It is therefore a general object of the invention to provide a blur detecting device, wherein there are provided a plurality of light receiving means for detecting a light flux coming from an object at different positions and electric charge storing means for storing electric charges according to the quantities of the light received at these different light receiving means; and the ratio of quantities of these electric charges stored during a period of time corresponding to an actual exposure time is compared with the ratio of quantities of these electric charges stored during a period of time shorter than the exposure time so that blur detection can be accurately accomplished.

The above and further objects and features of the invention will become apparent from the following detailed description of a preferred embodiment thereof taken in connection with the accompanying drawings.

DETAILED DESCRIPTION OF THE PREFERRED EMBODIMENT

Figure 1:
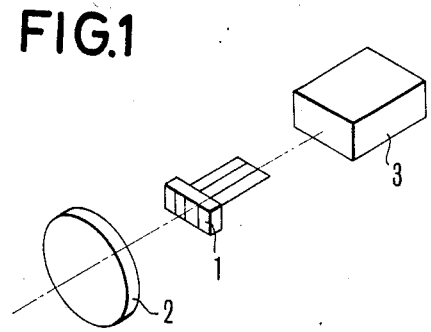
FIG. 1 is a schematic illustration of an embodiment of the invention.
Figure 2:
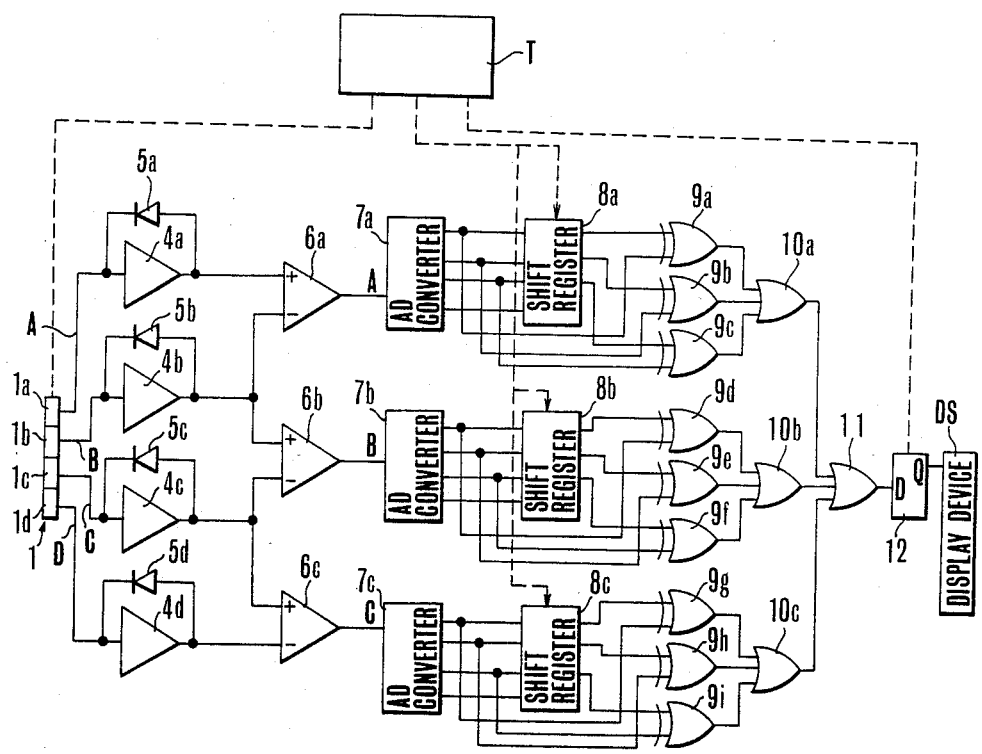
FIG. 2 is a circuit diagram showing a first circuit arrangement example of the embodiment shown in FIG. 1.

A preferred embodiment of the present invention is arranged as described below with reference to the accompanying drawings wherein FIG. 1 schematically shows the arrangement of the embodiment. Referring to FIG. 1, the embodiment includes a light receiving part 1, which in this specific embodiment consists of four photo-electric converter elements, though the number of these elements is not limited to four in accordance with this invention. An imaging lens 2 is arranged to form an image of an object to be photographed on the light receiving part 1. A signal processing circuit 3 is arranged to process signals produced from the light receiving part 1. The signal processing circuit 3 used in the embodiment shown in FIG. 1 is arranged as shown in FIG. 2. Referring to FIG. 2, the light receiving part 1 consists of photo-electric converter elements $1a$, $1b$, $1c$ and $1d$. These photo-electric converter elements $1a$, $1b$, $1c$ and $1d$ are respectively connected to the input terminals of operational amplifiers $4a$, $4b$, $4c$ and $4d$. The output terminals of the operational amplifiers $4a$, $4b$, $4c$ and $4d$ are respectively connected as feedback via diodes $5a$, $5b$, $5c$ and $5d$ to their input terminals and thus form negative feedback circuits. The output voltages of these operational amplifiers are thus arranged to be logarithmically compressed. Further, the output terminal of the operational amplifier $4a$ is connected to the non-inversion input terminal of a differential input type operational amplifier $6a$; that of the operational amplifier $4b$ to the inversion input terminal of the differential input type operational amplifier $6a$ and the non-inversion input terminal of a differential input type operational amplifier $6b$; that of the operational amplifier $4c$ to the inversion input terminal of the amplifier $6b$ and the non-inversion input terminal of a differential input operational amplifier $6c$; and that of the operational amplifier $4d$ to the inversion input terminal of the amplifier $6c$. The differential input type operational amplifiers $6a$, $6b$ and $6c$ are arranged to produce signals corresponding to differences between the output signals of the amplifiers $4a$ and $4b$, between those of the amplifiers $4b$ and $4c$ and between those of the amplifiers $4c$ and $4d$ respectively. The output terminals of the differential input type operational amplifiers $6a$, $6b$ and $6c$ are connected respectively to the input terminals of 4-bit AD converters $7a$, $7b$ and $7c$. The number of bits of these AD converters is set at four in this specific embodiment example just for the sake of description, though it is not limited to four in accordance with the invention. There are provided shift registers $8a$, $8b$ and $8c$ which are respectively arranged to be of the type having four bit parallel inputs. The four output terminals of the AD converter $7a$ are connected to four input terminals of the shift register $8a$. Of the four output terminals of this AD converter $7a$, the output terminals for the higher three bits are also connected to the input terminals of exclusive OR gates $9a$, $9b$ and $9c$ respectively. The output terminals of the shift register $8a$ for the higher three bits are connected respectively to other input terminals of the exclusive OR gates $9a$, $9b$ and $9c$. Similarly, the AD converter $7b$ and the shift register $8b$ are connected to exclusive OR gates $9d$, $9e$ and $9f$ respectively. The AD converter $7c$ and the shift register $8c$ are connected to exclusive OR gates $9g$, $9h$ and $9i$ also in the same manner. These exclusive OR gates $9a$–$9i$ are arranged to produce high level signals only when their input signals do not coincide with each other. The output terminals of the shift registers 8a, 8b and 8c for the lowest bits are left unconnected, because it is highly probable that their lowest bit outputs are buried too much in a signal noise level to give accurate signals. The output terminals of the exclusive OR gates 9a, 9b and 9c are respectively connected to the input terminals of an OR gate 10a. The output terminals of the exclusive OR gates 9d, 9e and 9f are connected to the input terminals of an OR gate 10b. The output terminals of the exclusive OR gates 9g, 9h and 9i are connected to the input terminals of another OR gate 10c. The output terminals of the OR gates 10a, 10b and 10c are in turn respectively connected to the input terminals of an OR gate 11. The output terminal of the OR gate 11 is connected to the D input terminal of a D type flip-flop 12. The flip-flop 12 is arranged to keep a signal that is supplied to the D input terminal at the time when a clock pulse signal is received. The Q output terminal of the flip-flop 12 is connected to a display device which is arranged to give warning against a camera-shake due to hand vibration. The embodiment further includes a known timer circuit T which is arranged to produce a pulse signal therefrom at the timing described later herein for the purpose of carrying out sequential control.

Figure 3:
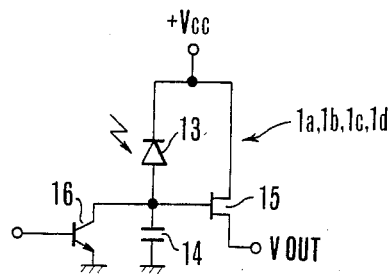
FIG. 3 is a circuit diagram showing the light receiving part of the embodiment shown in FIG. 1.

FIG. 3 shows circuit arrangement for each of the photo-electric converter elements 1a, 1b, 1c and 1d of the light receiving part 1. Referring to FIG. 3, a photo diode 13 is reversely biased. Upon receipt of light, a current flows in the reverse direction according to the quantity of the light. The anode of the photo diode 13 is grounded via the collector and emitter of a transistor 16 and is also grounded via a capacitor 14. The anode of the diode 13 is further connected to the gate of a field-effect transistor 15. A power source Vcc is connected to the cathode of the photo diode 13 and is further connected to the input terminals of the operational amplifiers 4a, 4b, 4c and 4d via the drain and source of the field-effect transistor 15. The transistor 16 has a power source switch which is not shown connected to the base thereof. The capacitor 14 is arranged to accumulate an electric charge which has flowed to the photo diode 13. The field-effect transistor 15 produces from its source an output corresponding to a voltage produced by the electric charge accumulated by the capacitor 14. The transistor 16 serves as a resetting transistor by discharging the electric charge accumulated by the capacitor 14. The photo-electric converter elements 1a, 1b, 1c and 1d which constitute the light receiving part 1 may be replaced with something like the self-storage type photosensors disclosed in Japanese Laid-Open patent application No. SHO 56-157073.

Figure 4:
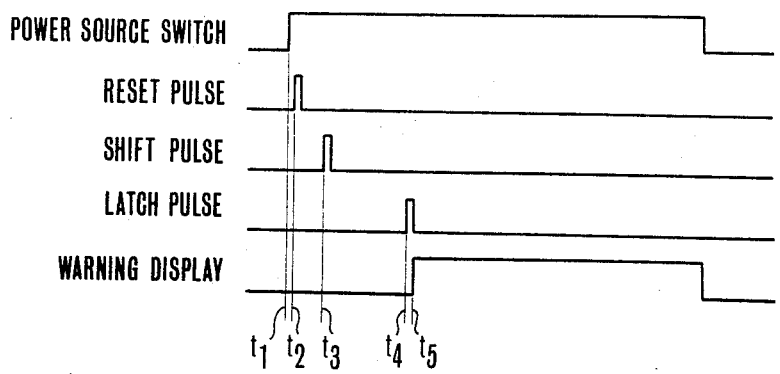
FIG. 4 is a time chart showing the operation of the circuit arrangement of FIG. 2.

The circuit arrangement described in the foregoing operates as described below with reference to FIG. 4 which is a time chart. A roughly formed image of an object to be photographed is projected on the light receiving part 1 via the imaging lens 2 which is disposed within a camera (not shown). When power supply is effected from a power source to the timer circuit T at a point of time t1 in response to a shutter release operation, the pulse signal from the timer circuit T is supplied to the transistor 16 at a point of time t2. Then, the electric charge accumulated at the capacitor 14 is discharged to reset it. After that, the photo diode 13 causes an electric charge to be accumulated at the capacitor 14 according to the quantity of light received from the above-stated object image. Then, by the voltage thus developed there, the photo-electric converter elements 1a, 1b, 1c and 1d respectively produce signals A, B, C and D corresponding to the quantities of light received by these elements. These signals are supplied to and amplified by the operational amplifiers 4a, 4b, 4c and 4d and then are supplied to the differential input type operational amplifiers 6a, 6b and 6c. The amplifiers 6a, 6b and 6c respectively produce signals which correspond to differences between these input signals and can be expressed by the following formulas: $\log A - \log B = \log A/B$; $\log B - \log C = \log B/C$; and $\log C - \log D = \log C/D$. The signals thus obtained are supplied to the AD converters 7a, 7b and 7c. They are converted into digital signals and are produced from these converters. With the photo-electric converter elements 1a, 1b, 1c and 1d reset at the point of time t2, shift pulses from the above-stated timer circuit T are supplied to the shift registers 8a, 8b and 8c at a point of time t3 after the lapse of a very short period of time, say, 1–2 m. sec, which is much shorter than an exposure time. Then, the shift registers 8a, 8b and 8c take in and store the values of the signals that are produced at the point of time t3 among other signals also produced from the AD converters 7a, 7b and 7c. For the sake of simplification of description, let us here assume that the values to be stored at the point of time t3 by the shift registers 8a, 8b and 8c are a digitized value of the above-stated signal values $\log A/B$, $\log B/C$ and $\log C/D$ respectively.

Then, at a point of time after the lapse of a relatively long period of time corresponding to the exposure time, a latch pulse is supplied from the timer circuit T to the flip-flop 12. The exclusive OR gates 9a–9i compare the outputs of the AD converters 7a, 7b and 7c with the outputs stored at the shift registers 8a, 8b and 8c. When any of the signals produced from the exclusive OR gates 9a–9i is at a high level, that is, when any of the outputs of the AD converters 7a, 7b and 7c fail to coincide with the corresponding output of the shift register 8a, 8b or 8c, some of the OR gates 10a, 10b and 10c produce a high level signal to make the output level of the OR gate 11 high. Therefore, in that instance, the output of the OR gate 11 produced at the point of time t4 is stored by the flip-flop and is supplied to the display device DS for a prescribed length of time until a reset pulse is applied to the flip-flop 12. In the event of no blur of the picture image signal, assuming that an arbitrary constant is $\alpha$, the outputs A, B, C and D of the photo-electric converter elements 1a, 1b, 1c and 1d produced at the point of time t4 become $\alpha A$, $\alpha B$, $\alpha C$ and $\alpha D$. Accordingly, the outputs of the AD converters 7a, 7b and 7c produced at the time t4 become $\log \alpha A - \log \alpha B = \log A/B$, $\log \alpha B - \log \alpha C = \log B/C$ and $\log \alpha C - \log \alpha D = \log C/D$ and thus come to coincide perfectly with the corresponding outputs of the shift registers 8a, 8b and 8c. The output level of the OR gate 11 then remains low and the display device DS makes no display. On the other hand, in the case where the image of the photographing object formed on the photo-electric converter elements 1a, 1b, 1c and 1d moves during the period between the time t3 and the time t4, the above-stated value $\alpha$ applied to the outputs A, B and C of the photoelectric converter elements 1a, 1b, 1c and 1d becomes no longer constant and the ratio of the outputs varies. As a result, some of the outputs of the AD converters 7a, 7b and 7c and the output of the shift register 8a, 8b or 8c corresponding thereto no longer coincide with each other. Therefore, the OR gate 11 produces a high level signal and, after the point of time t4, a high level signal is produced from the flip-flop 12 to the display device DS. Then, at another point of time t5, the display device DS begins to make a display for a predetermined period of time to give warning to the photographer against the blurred condition.

In this embodiment, as described above, the ratios of light quantities received by the photo-electric converter elements are used for comparison between picture image signals obtained at different points of light receiving time. This arrangement effectively eliminates the possibility that some periodic blur might come to coincide with the light receiving time to prevent detection thereof, so that any blur due to hand vibration, etc. can be accurately detected without fail.

Figure 5:
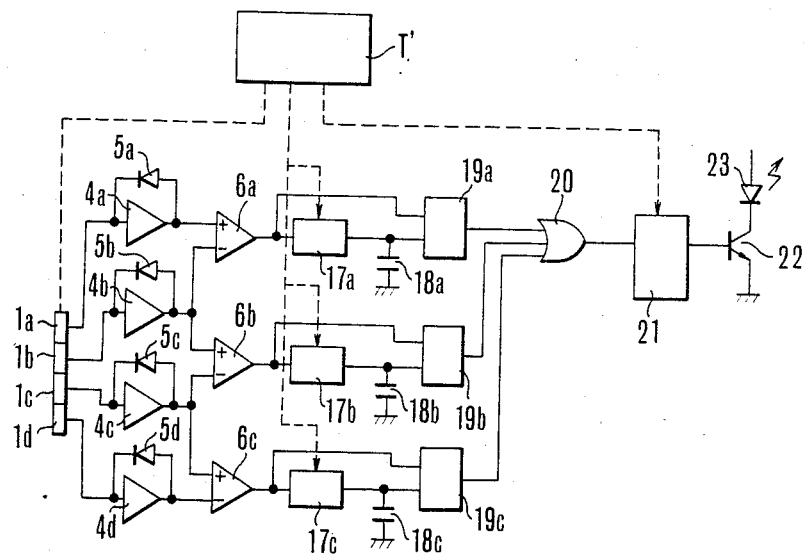
FIG. 5 is a circuit diagram showing a second circuit arrangement example of the embodiment shown in FIG. 1.

FIG. 5 shows another example of a circuit arrangement for the embodiment shown in FIG. 1. In this drawing, the elements identical with the corresponding ones shown in FIG. 2 are indicated by the same reference numerals as those used in FIG. 2 and the details of them are omitted from the following description. In the case of FIG. 5, the embodiment is provided with analog switches 17a, 17b and 17c which are arranged to be controlled by a timer circuit T'; capacitors 18a, 18b and 18c; window type comparators 19a, 19b and 19c which are arranged to produce high level outputs when a level difference between two inputs of each of them becomes higher than a prescribed value; an OR gate 20; a D type flip-flop 21 which latches an input signal received when a latch pulse is supplied from the timer circuit T'; a transistor 22; and a light emitting diode 23 which displays a warning.

Figure 6:
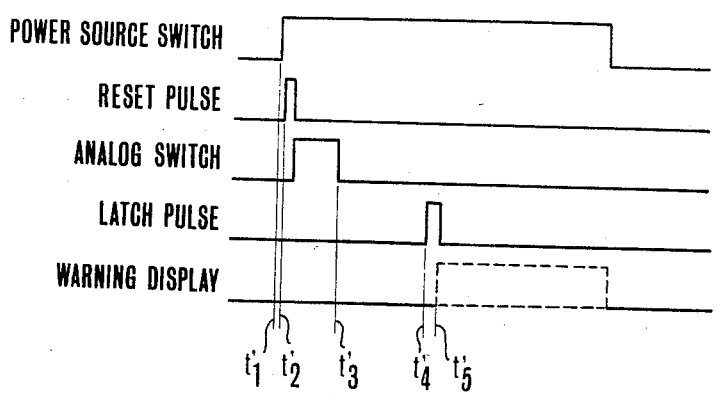
FIG. 6 is a time chart showing the operation of the circuit arrangement of FIG. 5.

The operation of the circuit arrangement described above is described with reference to the time chart of FIG. 6 as follows. When a shutter button which is not shown or the like is despressed, power supply is effected to the timer circuit T' at a point of time t'1. Then, at a point of time t'2, the electric charge stored at the capacitor 14 of each of the photo-electric converter elements 1a, 1b, 1c and 1d (see FIG. 3) is reset by a signal from the timer circuit T'. After that, the capacitors 14 of the photoelectric converter elements 1a–1d accumulate electric charges according to the quantities of light received by them. The electric charges thus accumulated by the capacitors 14 of these photo-electric converter elements 1a–1d are logarithmically compressed by the operational amplifiers 4a–4d. Then, the differential input type operational amplifiers 6a–6c provide differences between adjacent outputs of the photo-electric converter elements 1a–1d. Since these outputs have been logarithmically compressed by the operational amplifiers 4a–4d, the differences obtained from the differential input type operational amplifiers 6a–6c represent ratios of these outputs. At another point of time t'3 after the lapse of a relatively short period of time as compared with the exposure time, a signal from the timer circuit T' causes the analog switches 17a, 17b and 17c to turn off. As a result, the signals obtained at the point of time t'3 are kept at capacitors 18a, 18b and 18c. Then, at a point of time t'4 after the lapse of a relatively long period of time corresponding to the exposure time, the timer circuit T' applies a latch pulse to the flip-flop 21. The window comparators 19a, 19b and 19c are arranged to detect whether the differences between the signals kept at the capacitors 18a, 18b and 18c and the outputs of the differential input type operational amplifiers 6a, 6b and 6c exceed a predetermined value or not. If any of the differences exceeds the predetermined value, a high level output is produced from the applicable window comparator 19a, 19b or 19c. In other words, some of the window comparators 19a, 19b and 19c produce a high level signal when the picture image is blurred. Accordingly, if a high level signal is produced from any of the window comparators 19a, 19b and 19c at the point of time t'4, this signal is supplied via the OR gate 20 to the flip-flop 21 to be kept there. Then, the transistor 22 turns on to cause the light emitting diode 23 to light up to give warning against a blur for a predetermined period of time after a point of time t'5.

In the case of the circuit arrangement of FIG. 5, as described above, a warning is given against a blur through analog signal processing when the ratio of the adjacent outputs of the photo-electric converter elements 1a–1d, produced during a relatively short period of time and the ratio of the adjacent outputs produced during a relatively long period of time do not coincide with each other. Further, storage type sensors which are similar to those of FIG. 3 are used as the photo-electric converter elements also in this case.

As described in the foregoing, in accordance with the present invention, a blurred condition such as a blur due to hand vibration can be accurately detected with simple structural arrangement. Besides, the light receiving part can be used also as a sensor for focus detection. Therefore, the device in accordance with the invention is extremely useful.

What we claim:

1. A detector for detecting the moving of a still picture image, comprising:
    (a) a plurality of light receiving means arranged to detect a light flux from an object;
    (b) a plurality of storing means arranged in association with said plurality of light receiving means to store values of light fluxes received by said light receiving means;
    (c) computing means for computing ratios between the outputs of said plurality of storing means; and
    (d) comparison means for comparing the outputs of said computing means produced for different lengths of light receiving time of the light receiving means.

2. A detector according to claim 1, wherein said comparison means includes output means which indicates that an image of the object is not moving on said light receiving means when the outputs of said computing means approximately coincide with each other and indicates that the image of the object is moving on said light receiving means when the outputs of said computing means do not coincide with each other.

3. A detector according to claim 2, wherein said comparison means includes display means for displaying the output state of said output means.

4. A detector according to claim 3, wherein said storing means is arranged to be capable of non-destructively producing the values stored therein.

5. A blur detecting device for detecting a blurred state of a picture image in a camera, comprising:
    (a) a plurality of photo-electric converter elements arranged to convert light coming from an object to be photographed into electrical quantities according to quantities of the light received at different positions;
    (b) a plurality of electric charge storing elements arranged to store the electrical quantities converted by said photo-electric converter elements;

(c) a computing circuit arranged to compute ratios of the electrical quantities stored by said electric charge storing elements; and (d) a comparison circuit which compares the outputs of said computing circuit produced for different lengths of time during which the light is received at said photo-electric converter elements, said comparison circuit being arranged to indicate that the image of said object is not blurring when the outputs of said computing circuit approximately coincide with each other and to indicate that the object image is blurred when the outputs of the computing circuit do not coincide with each other.

6. A device according to claim 5, wherein said comparison circuit includes:

(a) a storing circuit for temporarily storing the outputs of said computing circuit, said storing circuit being arranged to store the outputs of the computing circuit for a first length of light receiving time of said photo-electric converter elements; and (b) a comparator which compares the outputs of said storing circuit with the outputs of said computing circuit produced for a second length of the light receiving time of said photo-electric converter elements which is longer than said first length of light receiving time.

7. A device according to claim 6, wherein either said first length of light receiving time or said second length of light receiving time is set at a shorter length of time than an exposure time while the other is set at a length of time corresponding to the exposure time of the camera.

8. A device according to claim 6 or 7, further including a timer circuit for setting said first and second lengths of light receiving time.

9. A device according to claim 8, further including a display circuit for displaying the output of said comparison circuit.

10. A device according to claim 9, wherein said electric charge storing elements are arranged to be capable of non-destructively producing the stored states of said electrical quantities.

11. A blur warning device for giving warning against a camera-shake due to hand vibration, comprising:

(a) a plurality of photo-electric converter elements arranged to convert light coming from an object to be photographed into electrical quantities according to quantities of the light received at different positions;

(b) a plurality of electric charge storing elements arranged to store the electrical quantities converted by said photo-electric converter elements;

(c) a plurality of operational amplifiers for logarithmically compressing the outputs of said plurality of electric charge storing elements;

(d) differential input type operational amplifiers for obtaining differences between outputs of adjacent ones of said plurality of operational amplifiers;

(e) AD converters for converting the outputs of said differential input type operational amplifiers into digital signals;

(f) shift registers for temporarily storing the outputs of said AD converters, said shift registers being arranged to store the outputs of said AD converters after the lapse of a first predetermined length of time from commencement of the operation of said electric charge storing elements;

(g) gates for determining agreement or disagreement between the outputs of said AD converters and the outputs of said first registers corresponding to the former outputs;

(h) an output part for producing the outputs of said gates after the lapse of a second predetermined length of time from the commencement of the operation of said electric charge storing elements, said second predetermined length of time differing in length from said first predetermined length of time; and (i) a display part for displaying the output state of said output part, said display part being arranged to give warning against a camera-shake due to hand vibration when said disagreement is determined by some of said gates.

12. A device according to claim 11, wherein said first length of time is set at a shorter length of time than an exposure time while the second is set at a length of time corresponding to the exposure time of the camera.

13. A device according to claim 12, further including a timer circuit for setting said first and second lengths of time.

14. A device according to claim 12 or 13, wherein each of said gates is arranged not to receive any signal that corresponds to the lowest bit portion of the output of each of said AD converters.

15. A device according to claim 14, wherein said gates include exclusive OR gates.

16. A device according to claim 15, wherein said output part includes a flip-flop circuit.

17. A device according to claim 16, wherein said electric charge storing elements are arranged to be capable of non-destructively producing the stored states of said electrical quantities.

18. A blur warning device for giving warning against a camera-shake due to hand vibration, comprising:

(a) a plurality of photo-electric converter elements arranged to convert light coming from an object to be photographed into electrical quantities according to quantities of the light received at different positions;

(b) a plurality of electric charge storing elements arranged to store the electrical quantities converted by said photo-electric converter elements;

(c) a plurality of operational amplifiers for logarithmically compressing the outputs of said plurality of electric charge storing elements;

(d) differential input type operational amplifiers for obtaining differences between outputs of adjacent ones of said plurality of operational amplifiers;

(e) storing circuits which store the outputs of said differential input type operational amplifiers;

(f) switching means for allowing or inhibiting supply of inputs to said storing circuits, said switching means being arranged to cut off the outputs of said differential input type operational amplifiers after the lapse of a first predetermined length of time from commencement of the operation of said electric charge storing elements;

(g) a comparison circuit arranged to determine agreement or disagreement between the outputs of said differential input type operational amplifiers and the outputs of said storing circuits corresponding to the outputs of said differential input type operational amplifiers;

(h) an output part for producing the outputs of said gates after the lapse of a second predetermined length of time from the commencement of the operation of said electric charge storing elements, said second predetermined length of time differing in length from said first predetermined length of time; and (i) a display part for displaying the output state of said output part, said display part being arranged to give warning against a camera-shake due to hand vibration when said disagreement is determined by some of said gates.

19. A device according to claim 18 wherein said first length of time is set at a shorter length of time than an exposure time while the second is set at a length of time corresponding to the exposure time of the camera.

20. A device according to claim 19 further including a timer circuit for setting said first and second lengths of time.

21. A device according to claim 20 wherein said electric charge storing elements are arranged to be capable of non-destructively producing the stored states of said electrical quantities.

* * * * *